(12) United States Patent
Lehmen et al.

(10) Patent No.: US 9,108,620 B2
(45) Date of Patent: Aug. 18, 2015

(54) METHOD TO REDUCE POWERTRAIN NOISE AND VIBRATION DURING ENGINE START IN HYBRID VEHICLE

(75) Inventors: Allen J Lehmen, Howell, MI (US); Poh Fong Chin, Novi, MI (US); Michael J. Grimmer, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 657 days.

(21) Appl. No.: 13/408,127

(22) Filed: Feb. 29, 2012

(65) Prior Publication Data

US 2013/0225363 A1    Aug. 29, 2013

(51) Int. Cl.
| B60W 10/06 | (2006.01) |
| B60W 20/00 | (2006.01) |
| B60W 10/08 | (2006.01) |
| B60W 10/10 | (2012.01) |
| B60W 30/192 | (2012.01) |
| F16H 59/54 | (2006.01) |
| F16H 63/48 | (2006.01) |
| B60W 30/18 | (2012.01) |
| F16H 61/22 | (2006.01) |

(52) U.S. Cl.
CPC ............... *B60W 10/06* (2013.01); *B60W 10/08* (2013.01); *B60W 10/10* (2013.01); *B60W 20/00* (2013.01); *B60W 30/192* (2013.01); *F16H 59/54* (2013.01); *F16H 63/48* (2013.01); *B60W 20/108* (2013.01); *B60W 30/18027* (2013.01); *B60Y 2300/205* (2013.01); *F16H 2061/223* (2013.01); *Y02T 10/6286* (2013.01); *Y10T 477/23* (2015.01); *Y10T 477/24* (2015.01)

(58) Field of Classification Search
CPC ... B60W 10/06; B60W 10/08; B60W 10/196; B60W 20/108; B60W 30/192; F16H 59/54; F16H 63/48; B60Y 2300/205
See application file for complete search history.

(56) References Cited

U.S. PATENT DOCUMENTS 6,494,801 B1 * 12/2002 Ohtake et al. ............... 475/5

* cited by examiner

*Primary Examiner* — Huan Le
(74) *Attorney, Agent, or Firm* — Quinn Law Group, PLLC

(57) ABSTRACT

A method of controlling a powertrain system of a hybrid vehicle includes detecting a request to start an engine, incrementally applying torque to the powertrain system, and biasing the torque against a static member of the powertrain system, such as a parking pawl of a transmission when the transmission is disposed in a parking position, to remove lash from the powertrain system prior to starting the engine.

19 Claims, 2 Drawing Sheets

METHOD TO REDUCE POWERTRAIN NOISE AND VIBRATION DURING ENGINE START IN HYBRID VEHICLE

TECHNICAL FIELD

The invention generally relates to a method of controlling a hybrid vehicle, and more specifically to a method of controlling a powertrain system of the hybrid vehicle having a transmission that does not include a mechanical neutral for disconnecting an output of the transmission from an engine.

BACKGROUND

Vehicular powertrain systems include a number of different components interfacing together. The various different component interfaces may each introduce lash into the powertrain system, i.e., a looseness or slop between the various component interfaces that allow connecting components to move relative to each other.

Some powertrain systems of strong hybrid vehicles do not include a mechanical neutral for disconnecting an output of the transmission from an engine. Accordingly, the output of the transmission is continuously connected in torque transmitting communication with the engine. Therefore, because the engine is continuously connected to the other components of the powertrain system, when the engine is started and applies torque to the powertrain system, the torque from the engine will suddenly load the powertrain system and take up the lash, often causing undesirable noise and vibration.

SUMMARY

A method of controlling a hybrid vehicle having an output of a transmission that is continuously connected in torque transmitting communication to an engine is provided. The method includes detecting a request to start the engine. Torque is applied to a powertrain system of the hybrid vehicle. The applied torque is biased against a static member to remove lash from the powertrain system prior to starting the engine.

A method of controlling a powertrain system having a transmission that does not include a mechanical neutral for disconnecting an output of the transmission from an engine is also provided. The method includes detecting a request to start the engine. A lash state (positive or negative) of the powertrain system is sensed relative to a horizontal plane (zero lash). A determination is made based upon the sensed position of the powertrain system whether an applied torque will load or unload the powertrain system. Torque is incrementally applied to a component of the powertrain system over a period of time upon a determination that an applied torque will load the powertrain system and remove lash therefrom. The applied torque is biased against a static member to gradually remove lash from the powertrain system over the period of time and prior to starting the engine. The applied torque is incrementally removed from the powertrain system after the lash is removed from the powertrain system.

Accordingly, torque is incrementally applied to the powertrain system and biased against the static member to remove the lash from the powertrain system, i.e., de-lash the powertrain system, prior to starting the engine. As such, when the engine is started and applies torque to the powertrain, the lash in the powertrain is already removed, thereby preventing the torque from the engine from suddenly de-lashing the powertrain system, which prevents or minimizes any undesirable noise and/or vibration caused therefrom.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
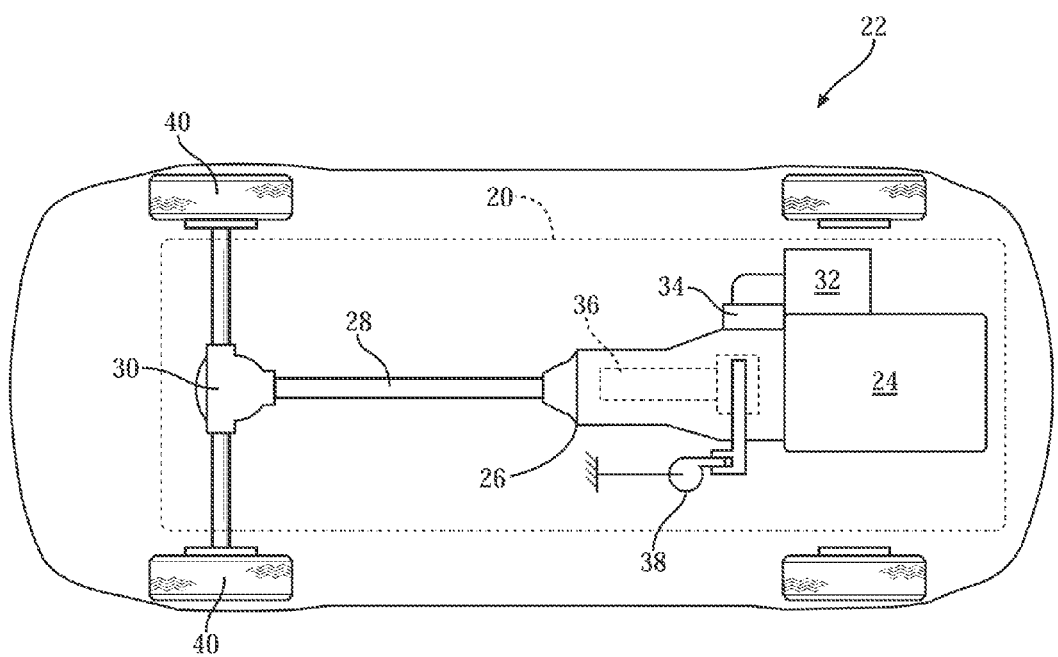
FIG. 1 is a schematic diagram of a powertrain system of a hybrid vehicle.

Referring to the Figures, wherein like numerals indicate like parts throughout the several views, a powertrain system is generally shown at 20 in FIG. 1. The powertrain system 20 is for a hybrid vehicle, which is generally shown at 22 in FIG. 1.

Referring to FIG. 1, the powertrain system 20 may include but is not limited to an engine 24, a transmission 26, a driveline 28, a differential 30, an electric motor 32, an electric torque converter 34, etc. The engine 24 may include but is not limited to an internal combustion engine 24, such as a gasoline engine 24 or a diesel engine 24. The transmission 26 is operable in different operating positions, such as a reverse drive position, a forward drive position or a park position. The transmission 26 may include a gearset 36, clutches, brakes, etc. capable of defining a plurality of different gear ratios, such as but not limited to a first forward gear ratio, a second forward gear ratio, . . . , a fifth forward gear ratio, etc. The transmission 26 may further include a parking pawl 38 that mechanically engages the gearset 36 to mechanically block rotation of an output of the transmission 26. The transmission 26 may also include a chain drive, which if included, may be a significant contributor of lash into the powertrain system 20. The output of the transmission 26 is coupled to the differential 30 via the driveline 28 for driving one or more wheels 40. As is common in hybrid vehicles 22, the transmission 26 may not include a mechanical neutral, i.e., a neutral position that is capable of mechanically disconnecting the output of the transmission 26 from the engine 24. Accordingly, the output of the transmission 26 is continuously connected in torque transmitting communication to the engine 24. The powertrain system 20 is shown in FIG. 1 representing a rear wheel drive system for convenience. However, it should be appreciated that the powertrain system 20 may alternatively be configured as a front wheel drive system.

Figure 2:
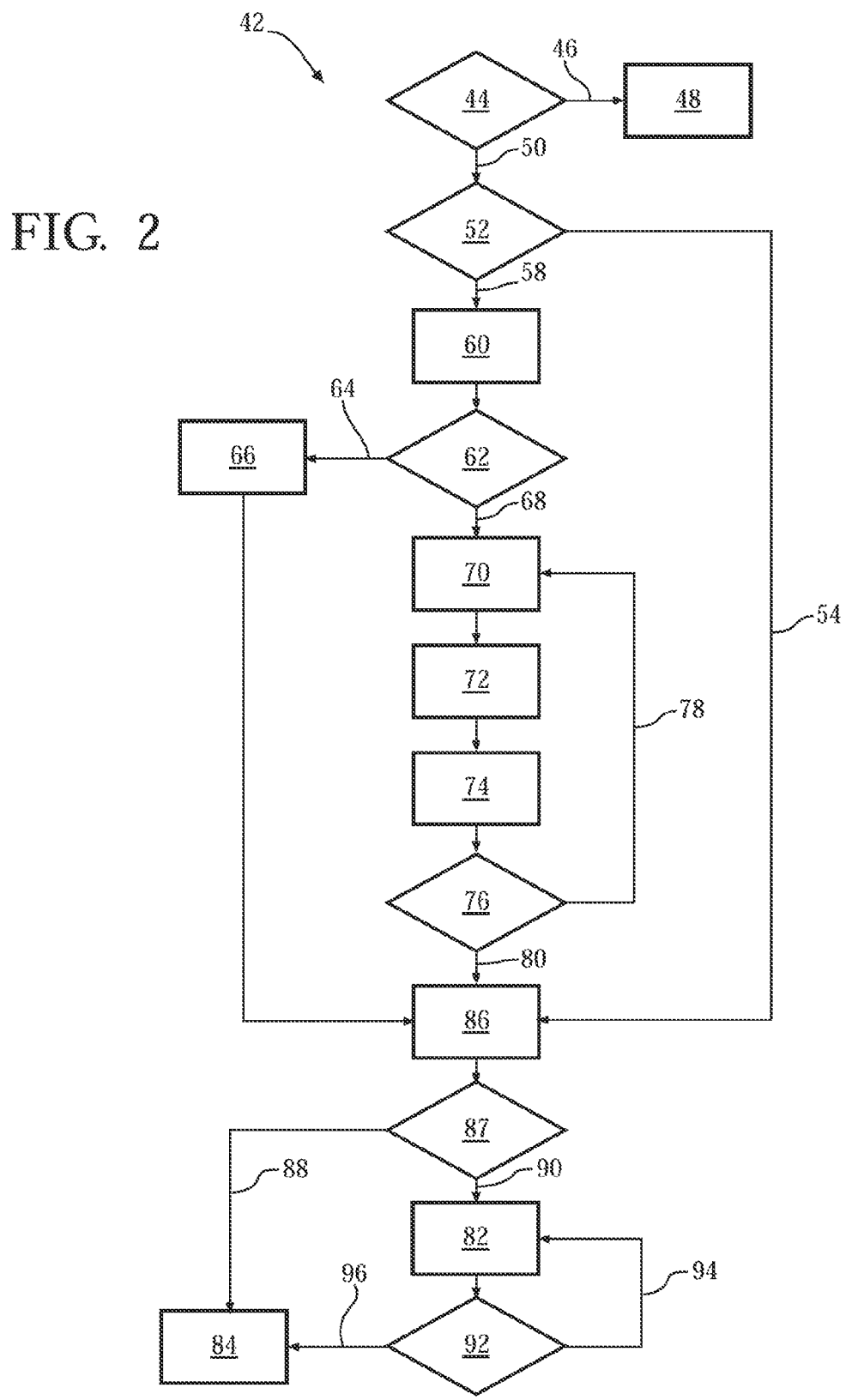
FIG. 2 is a flow chart showing a method of applying torque to the powertrain system of the hybrid vehicle to remove lash from the powertrain system prior to starting an engine of the powertrain system.

Referring also to FIG. 2, a method of controlling the hybrid vehicle 22, and more specifically the powertrain system 20 of the hybrid vehicle 22, is generally shown at 42. The method 42 may be embodied as a control algorithm operable on a control module. Accordingly, the steps of the below described method may be coded into the control algorithm and performed and/or executed by the control module. As such, it should be appreciated that the control module may include but is not limited to a computer or processor, memory, various sensors configured for sensing data at one or more components of the powertrain system 20, a communication system for electronically communicating information between the control module and the various components of the powertrain system 20, such as but not limited to the various sensors, and any other software and hardware necessary to communicate and control the various components of the powertrain system 20 and implement the method disclosed herein.

The method includes detecting a request to start the engine 24, generally indicated by box 44. The request to start the engine 24 may be either a key start request, such as but not limited to turning an ignition key to a start position, or an auto-start request, such as but not limited to an automatic request from a control module to start the engine 24 to perform a vehicular function, such as heat a cabin area.

If no request to start the engine 24 is detected, indicated at 46, then no action is taken, generally indicated by box 48. However, if a request to start the engine 24 is detected, generally indicated at 50, a driver requested gear selection position (e.g., a PRNDL position) of the transmission 26 is sensed to determine if the transmission 26 is disposed in the park position with the parking pawl 38 engaged to mechanically block rotation of the output of the transmission 26, generally indicated by box 52. If the transmission 26 is not disposed in the park position, generally indicated at 54, then no torque is applied and the engine is started, which is generally indicated by box 86. However, if the transmission 26 is disposed in the park position with the parking pawl 38 engaged, which is generally indicated at 58, then torque may be applied to load and de-lash the powertrain system 20.

If the transmission 26 is disposed in the park position, then a lash state of the vehicle 22 relative to a horizontal plane is sensed, generally indicated by box 60. The horizontal plane represents or generates zero lash in the powertrain system 20. The position of the lash state may be in either direction relative to the horizontal plane, i.e., may be either negative or positive. The lash state of the vehicle 22 relative to the horizontal plane is sensed to determine if an applied torque will load or unload the powertrain system 20. For example, if the vehicle 22 is parked on a hill, gravity may pre-load the powertrain system 20 and automatically de-lash the powertrain system 20, i.e., removing the lash from the powertrain. However, if torque is applied to the powertrain system 20 in a direction that counters the affects of gravity, then the torque may unload the powertrain system 20 and introduce lash back into the powertrain system 20. The lash state of the vehicle 22 relative to the horizontal plane may be sensed and/or measured in any suitable manner, including but not limited to sensing the orientation of the vehicle 22 and the powertrain system 20 with an appropriate sensor. The control module may be configured to receive the information regarding the orientation of the vehicle 22 relative to the horizontal plane, and make the determination, generally indicated by box 62, whether the orientation of the vehicle 22 is such that torque applied to the powertrain system 20 in a pre-defined direction would load or unload the powertrain system 20, i.e., remove lash from or introduce lash into the powertrain system 20.

Upon a determination that an applied torque will unload the powertrain, generally indicated at 64, then no torque is applied, generally indicated by box 66, and the engine 24 may be started, generally indicated by box 86. Upon a determination that an applied torque will load the powertrain system 20 and remove lash therefrom, generally indicated at 68, torque is applied to the powertrain system 20 of the hybrid vehicle 22, generally indicated by box 70. As such, torque is only applied when the applied torque will load the powertrain system 20 and remove the lash therefrom. Preferably, the torque is applied incrementally over a period of time to gradually increase the value or magnitude of torque applied, i.e., the torque is ramped up over time. For example, the torque may be ramped up over a period of time between the range of 0.1 and 0.5 seconds. The torque is applied to remove the lash from the powertrain system 20. The torque may be applied from any suitable power source, such as but not limited to the electric motor 32 of the hybrid powertrain system 20.

In order to remove the lash in the powertrain system 20, the applied torque must react against a stationary object or component of the powertrain system 20. Accordingly, the applied torque is biased against a static member to remove lash from the powertrain system 20 prior to starting the engine 24, generally indicated by box 72. The static member may include any component of the powertrain system 20 that is fixed to prevent rotation of the powertrain system 20. For example, the applied torque may be biased against the parking pawl 38 of the transmission 26 when the transmission 26 is disposed in the park position.

Once torque is applied to the powertrain system 20, then the state of lash in the powertrain system 20 may be sensed to determine if the lash is removed from the powertrain system 20, generally indicated by box 74. The state of lash may be sensed in any suitable manner, including but not limited to sensing the magnitude of torque applied to the powertrain system 20 with one or more sensors. The control module may be configured to determine whether the lash is removed or is not removed, generally indicated by box 76, based upon the value of the sensed torque. For example, once the sensed torque reaches a pre-defined level, the control module may determine that the lash is removed from the powertrain system 20.

Upon a determination that the lash is not removed from the powertrain system 20, generally indicated at 78, the applied torque is continued and biased against the static member. Upon a determination that the lash is removed from the powertrain system 20, generally indicated at 80, then the control module may allow the engine 24 to be started, generally indicated by box 86. Because the lash is removed from the powertrain system 20, torque from the engine 24 once started will not cause the various components of the powertrain system 20 to move, thereby eliminating or minimizing noise and vibration in the powertrain system 20 upon the engine 24 start, even though the engine 24 is continuously connected to the output of the transmission 26.

Once the engine 24 is started, then the control module may determine whether torque was applied to remove driveline lash, generally indicated by box 87. If the control module determines that no torque was applied to remove the driveline lash, generally indicated at 88, then the control module may allow a Brake Transmission Shift Interlock (BTSI) system to be unlocked, generally indicated by box 84, thereby allowing a transmission shift lever to be moved between positions. If the control module determines that torque was applied to remove driveline lash, generally indicated at 90, then the applied torque is removed from the powertrain system 20, generally indicated by box 82. Preferably, the torque is removed incrementally over a period of time to gradually remove the applied torque from the powertrain system 20, i.e., applied torque is ramped down. For example, the torque may be ramped up over a period of time between the range of 0.1 and 0.5 seconds.

If torque was applied to remove driveline lash, then the control module continuously monitors the powertrain system 20 to determine if all of the applied torque has been removed and/or eliminated from the powertrain system 20, generally indicated by box 92. If the control module determines that all of the applied torque has not been eliminated from the powertrain system 20, generally indicated at 94, then the control module continues to remove the applied torque, generally indicated by box 82. If the control module determines that all of the applied torque has been removed and/or eliminated from the powertrain system 20, generally indicated at 96, then the control module may allow the Brake Transmission Shift Interlock (BTSI) system to be unlocked, generally indicated by box 84, thereby allowing the transmission shift lever to be moved between positions.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of controlling a hybrid vehicle having an output of a transmission that is continuously connected in torque transmitting communication to an engine, the method comprising:
   detecting a request to start the engine;
   incrementally applying torque over a period of time to a powertrain system of the hybrid vehicle; and
   biasing the applied torque against a static member to gradually remove lash from the powertrain system prior to starting the engine.

2. A method as set forth in claim 1 wherein applying torque is further defined as applying torque from an electric motor.

3. A method as set forth in claim 1 wherein biasing the applied torque against the static member includes biasing the applied torque against a parking pawl of the transmission when the transmission is disposed in a park position.

4. A method as set forth in claim 3 further comprising sensing a position of the transmission to determine if the transmission is disposed in the park position with the parking pawl engaged to mechanically block rotation of the output of the transmission.

5. A method as set forth in claim 1 further comprising sensing a lash state of the vehicle relative to a horizontal plane.

6. A method as set forth in claim 5 further comprising determining if the applied torque will load or unload the powertrain system based upon a sensed position of the vehicle.

7. A method as set forth in claim 6 wherein applying torque to the powertrain system only occurs upon a determination that the applied torque will load the powertrain system and remove lash therefrom.

8. A method as set forth in claim 1 further comprising sensing the state of lash in the powertrain system to determine if the lash is removed from the powertrain system.

9. A method as set forth in claim 8 further comprising removing the applied torque from the powertrain system after the engine is started.

10. A method as set forth in claim 9 wherein removing the applied torque is further defined as incrementally removing the applied torque over a period of time.

11. A method as set forth in claim 9 further comprising unlocking a Brake Transmission Shift Interlock (BTSI) system after the applied torque is removed.

12. A method as set forth in claim 9 further comprising starting the engine after the lash is removed from the powertrain system.

13. A method of controlling a powertrain system having a transmission that does not include a mechanical neutral for disconnecting an output of the transmission from an engine, the method comprising:
   detecting a request to start the engine;
   sensing a position of the powertrain system relative to a horizontal plane;
   determining if an applied torque will load or unload the powertrain system based upon the sensed position of the powertrain system;
   incrementally applying the applied torque to a component of the powertrain system over a period of time upon a determination that the applied torque will load the powertrain system and remove lash therefrom;
   biasing the applied torque against a static member to gradually remove lash from the powertrain system over the period of time and prior to starting the engine; and
   incrementally removing the applied torque from the powertrain system after the lash is removed from the powertrain system.

14. A method as set forth in claim 13 wherein applying torque is further defined as applying torque from an electric motor.

15. A method as set forth in claim 13 further comprising unlocking a Brake Transmission Shift Interlock (BTSI) system after the applied torque is removed.

16. A method as set forth in claim 13 further comprising sensing the state of lash in the powertrain system to determine if the lash is removed from the powertrain system;

17. A method as set forth in claim 13 further comprising starting the engine after the lash and the applied torque are removed from the powertrain system.

18. A method as set forth in claim 13 wherein biasing the applied torque against the static member includes biasing the applied torque against a parking pawl of the transmission when the transmission is disposed in a park position.

19. A method as set forth in claim 18 further comprising sensing a position of the transmission to determine if the transmission is disposed in a park position with a parking pawl engaged to mechanically block rotation of the output of the transmission.

* * * * *